(12) United States Patent  (10) Patent No.: US 7,758,010 B2
Tanaka  (45) Date of Patent: Jul. 20, 2010

(54) SIDE MIRROR AND SIDE MIRROR UNIT (75) Inventor: Yoshihisa Tanaka, Shizuoka (JP)

(73) Assignee: Murakami Corporation, Shizuoka-shi (JP)

( * ) Notice: Subject to any disclaimer, the term of this patent is extended or adjusted under 35 U.S.C. 154(b) by 414 days.

(21) Appl. No.: 11/578,163

(22) PCT Filed: Apr. 13, 2005

(86) PCT No.: PCT/JP2005/007130

§ 371 (c)(1),
(2), (4) Date: Oct. 11, 2006

(87) PCT Pub. No.: WO2005/120899

PCT Pub. Date: Dec. 22, 2005

(65) Prior Publication Data

US 2007/0201153 A1 Aug. 30, 2007

(30) Foreign Application Priority Data

Jun. 8, 2004 (JP) ............................. 2004-169341

(51) Int. Cl.
B60R 1/06 (2006.01)
(52) U.S. Cl. .................... 248/475.1; 359/871
(58) Field of Classification Search ................ 359/871, 359/838; 248/475.1
See application file for complete search history.

(56) References Cited

U.S. PATENT DOCUMENTS 6,039,449 A * 3/2000 Dolan et al. ................ 359/871

2005/0083596 A1 * 4/2005 Jang ........................... 359/879

FOREIGN PATENT DOCUMENTS

| JP | 7-223490 | 8/1995 |
| JP | 11-139208 | 5/1999 |
| JP | 2003-267131 | 9/2003 |

* cited by examiner

Primary Examiner—Alessandro Amari
Assistant Examiner—Mark Consilvio
(74) Attorney, Agent, or Firm—Kratz, Quintos & Hanson, LLP (57) ABSTRACT A side mirror 14 which improves a working efficiency for mounting. The side mirror 14 mounted on a door panel 12 of a vehicle body includes a mirror 22, an external body 24 for housing and holding the mirror 22, and a mounting base 26 for supporting the external body 24; the door panel 12 has a circular hole 30 for positioning the mounting base 26; the mounting base 26 is a cross-shaped boss 32 of which section perpendicular to an axis direction is a cross-shape, a diameter of the section being nearly equal to that of the circular hole 30, and has a cross-shaped boss 32 to be inserted into the circular hole 30 of the door panel 12; the cross-shaped boss 32 has a groove extending in a direction approximately perpendicular to the axis direction on one of four side surfaces which envelop cross-shaped four ends along the axis direction respectively, and when the cross-shaped boss is inserted into the circular hole, the side mirror is temporarily fixed on the door panel by engaging a part of the inner wall of the circular hole with the groove.

5 Claims, 6 Drawing Sheets

SIDE MIRROR AND SIDE MIRROR UNIT

TECHNICAL FIELD

The present invention relates to a side mirror and a side mirror unit.

BACKGROUND ART

Figure 6:
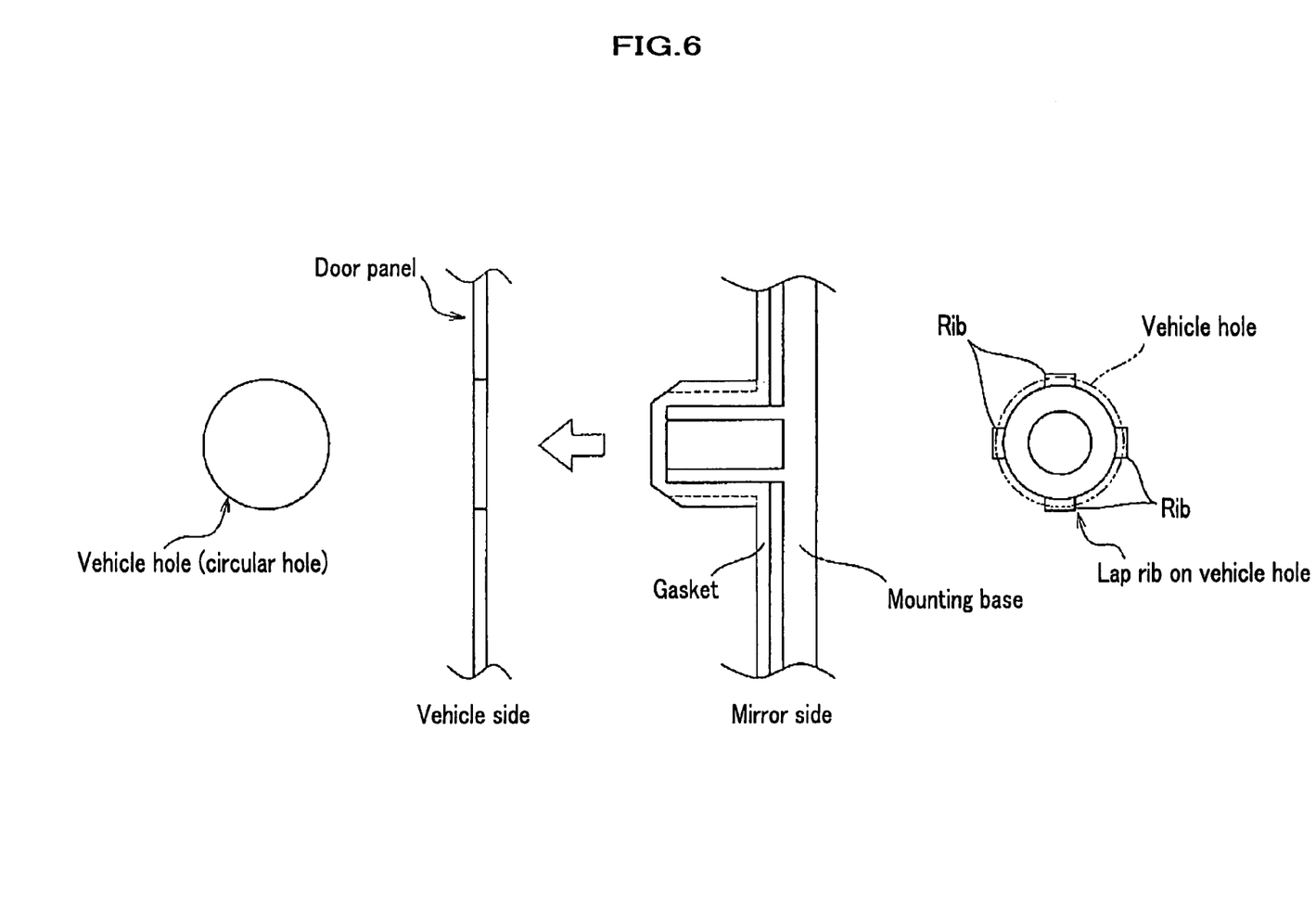
FIG. 6 is an illustration showing an example of a configuration of a conventional side mirror.

When a side mirror for vehicles is mounted, an operator fixes the side mirror with screw tightening or the like after temporarily fixing the side mirror once on a door panel at a vehicle side. FIG. 6 is an illustration showing an example of a configuration of a conventional side mirror. In the configuration, the door panel has a vehicle hole having a circular shape. In addition, a mounting base of the side mirror has a boss covered with a gasket, and the gasket has a rib which is protruded to a side surface direction of the boss.

When the side mirror is mounted, the rib is lapped to the vehicle hole by inserting the boss of the mounting base into the vehicle hole of the door panel, thereby causing a frictional force, the side mirror is temporarily held (temporary fixing) by the force.

In addition, in a mounting structure of a side mirror, a structure where an engagement claw is formed at an edge of a standard boss having a cross-shaped section has been known in the past (patent literature 1). The engagement claw is formed to protrude to a backward of a side mirror base (mounting base), and a rear part is tapered toward an edge.

Patent literature 1: Japanese Laid-Open Patent Publication No. H7-223490

DISCLOSURE OF THE INVENTION

Issues to be Solved by the Invention

However, in a structure where a temporary fixing is made by a frictional force, since a force is required for pushing-in a boss for lapping a rib over a vehicle hole, there is a possibility to decrease a working efficiency. In addition, a temporary fixing by the frictional force is easily taken off by a shock and the like.

In addition, when an engagement claw or the like is formed on an edge of a standard boss, it is necessary to insert the standard boss into a vehicle hole from an oblique direction. Therefore, in this case, it is necessary to incline a whole side mirror once for the temporary fixing, thereby resulting in the possibility of decreasing a working efficiency.

It is, therefore, an object of the present invention to provide a side mirror and side mirror unit which can solve the above-described issues.

Method for Solving the Issures

The present invention has a following configuration for solving the above-described issues.

(Configuration 1)

An invention according to a configuration 1 of the present invention includes a mirror, an external body for housing and holding the mirror, and a mounting base for supporting the external body in a side mirror mounted on a door panel of a vehicle body; the door panel has a circular hole for positioning the mounting base; the mounting base is a cross-shaped boss of which section perpendicular to an axis direction is cross-shaped, a diameter of the section being nearly equal to that of the circular hole, and has a cross-shaped boss to be inserted in the circular hole of the door panel; the cross-shaped boss has a groove extending in a direction approximately perpendicular to the axis direction on one of four side surfaces which envelop cross-shaped four ends along the axis direction respectively, and when the cross-shaped boss is inserted into the circular hole, the side mirror is temporarily fixed on the door panel by housing a part of the inner wall of the circular hole in the groove.

In this configuration, when the cross-shaped boss is inserted into the circular hole up to a depth reaching to the groove, a part of the inner wall of the circular hole bites into the groove. Accordingly, if configured like the above, the side mirror temporarily can be firmly fixed.

In addition, a structure forming the cross-shaped boss hardly causes a sink mark, compared with, for example, a structure where a boss is stuck up on a mounting base. Accordingly, if configured like the above, the mounting base can be formed as a good appearing quality product with high accuracy.

(Configuration 2)

In an invention according to a configuration 2 of the present invention, the cross-shaped boss is inserted into the circular hole by facing downward the one side surface on which the groove is formed and keeping the axis direction approximately horizontally.

If configured like the above, a part of the inner wall of the circular hole can be certainly housed in the groove due to a weight of the side mirror thereof.

In an invention according to a configuration 3 of the present invention, in the groove, a wall face at an edge side of the cross-shaped boss is approximately perpendicular to the one side surface, and a wall face at a root side of the cross-shaped boss is a slope beginning at a bottom and approaching the root side.

If configured like the above, a temporarily fixed side mirror can be prevented from coming off due to a mechanical shock and the like. In addition, screw tightening and the like for fixing a side mirror can be implemented smoothly.

(Configuration 4)

In an invention according to a configuration 4 of the present invention, the mounting base is fixed on the door panel under conditions where the cross-shaped boss is inserted into the circular hole up to the root side deeper than the groove.

If configured like the above, a side mirror can be fixed on the door panel by positioning the side mirror with high accuracy.

(Configuration 5)

An invention according to a configuration 5 of the present invention is a side mirror unit for vehicles, and includes a door panel attached to a vehicle body and a side mirror mounted on the door panel; the side mirror includes a mirror, an external body for housing and holding the mirror, and a mounting base for supporting the external body; the door panel has a circular hole for positioning the mounting base; the mounting base is a cross-shaped boss of which section perpendicular to an axis direction is a cross-shaped, a diameter of the section being nearly equal to that of the circular hole, and has a cross-shaped boss to be inserted in the circular hole of the door panel; the cross-shaped boss has a groove extending in a direction approximately perpendicular to the axis direction on one of four side surfaces which envelop four ends of the cross-shape along the axis respectively, and when the cross-shaped boss is inserted into the circular hole, the side mirror is temporarily fixed on the door panel by housing a part of the inner wall of the circular hole in the groove.

If configured like above, identical effects to the configuration 1 can be obtained.

ADVANTAGES OF THE INVENTION

According to the present invention, a working efficiency for mounting a side mirror can be improved.

BEST MODE FOR CARRYING OUT THE INVENTION

Hereinafter, an embodiment of the present invention will be explained by referring to figures.

Figure 1:
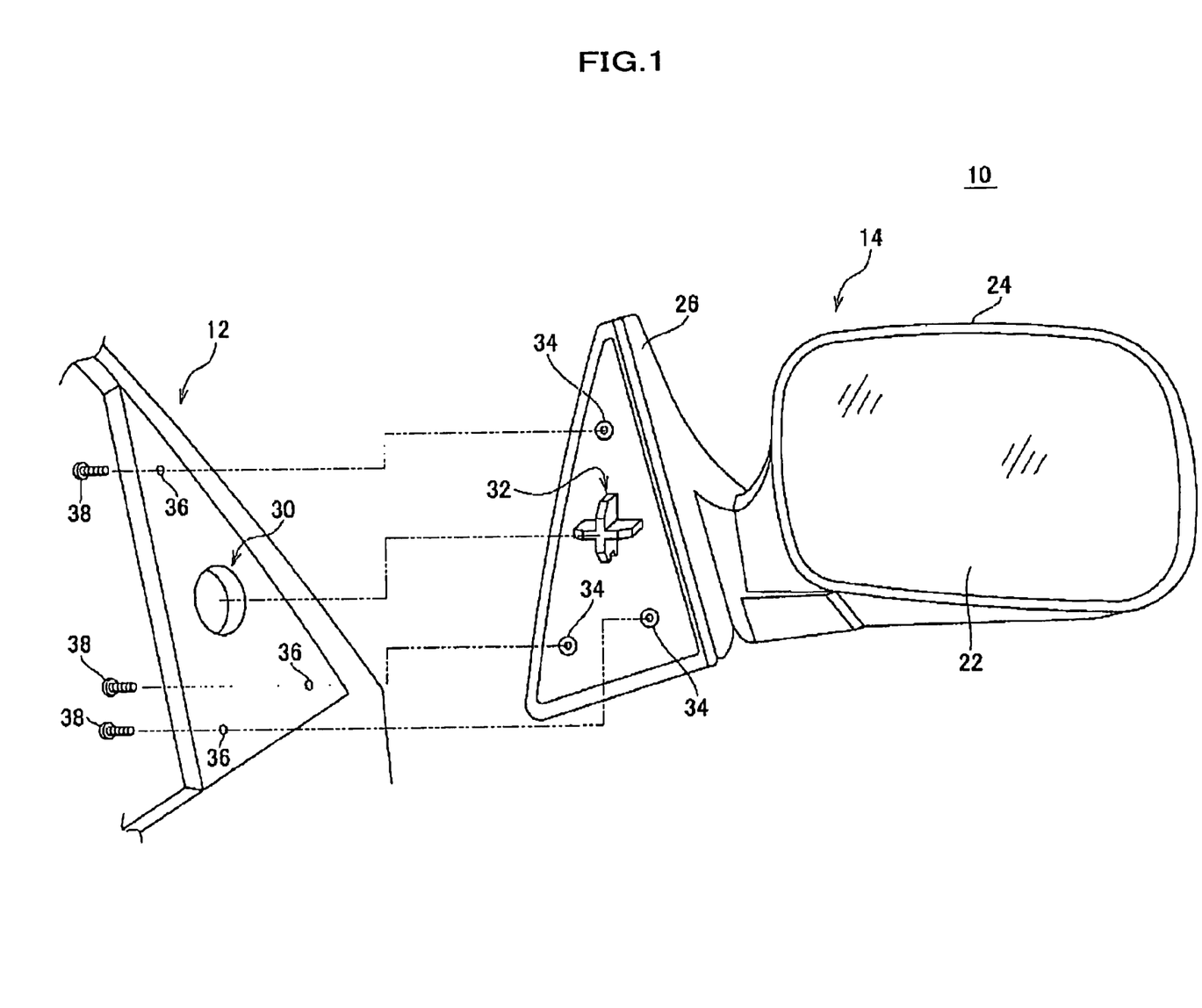
FIG. 1 is an illustration showing an example of a configuration of a side mirror unit 10 according to an embodiment of the present invention.

FIG. 1 is an example showing a configuration of a side mirror unit 10 according to an embodiment of the present invention. An object of the example is to provide a side mirror unit which has a good mounting efficiency. The side mirror unit 10 includes a door panel 12 and a side mirror 14, and disposed on a front door of a motor vehicle.

The door panel 12 is attached onto a vehicle body of a motor vehicle, and has a circular hole 30 for positioning the side mirror 14 and a plurality of through holes 36. The door panel 12 has approximately a triangle shape, and is attached onto a front side of a door waist of the vehicle body.

The side mirror 14 includes a mirror 22, an external body 24, and a mounting base 26. The external body 24 is a member for housing and holding the mirror 22, and formed so as to cover the mirror 22 from a front side of the vehicle.

The mounting base 26 is a member for supporting the external body 24, and has a cross-shaped boss 32 and a plurality of screw holes 34. The cross-shaped boss 32 is a boss whose section perpendicular to an axis direction has a cross-shape, and has a notch-shaped groove on a part of a bottom surface (under part). In addition, a diameter of a section of the cross-shaped boss 32 is nearly equal to that of the circular hole 30. The plurality of screw holes 34 are meant for a plurality of screws 38, and formed at positions corresponding to the plurality of through holes 36.

Meanwhile, in a configuration described above, the diameter of the section of the cross-shaped boss is a diameter of a circumscribed circle of the section. In addition, the section is a section where the groove is not formed.

Hereinafter, a process for mounting the side mirror 14 on the door panel 12 will be explained. In the process, first, for positioning the side mirror 14, a position of the cross-shaped boss 32 and that of the circular hole 30 are fitted.

Next, by inserting the cross-shaped boss 32 into the circular hole 30, the side mirror 14 is temporarily fixed on the door panel 12. This insertion is implemented until the groove at the bottom surface of the cross-shaped boss 32 reaches an inner wall of the circular hole 30. Through the insertion, the groove at the bottom surface of the cross-shaped boss 32 is hooked on a vehicle sheet metal at the inner wall of the circular hole 30, and the vehicle sheet metal is clamped in the groove. Therefore, with the temporary fixing, the side mirror 14 can be properly prevented from, for example, coming off due to a mechanical shock or the like.

Then, the screw 38 which passes through the through hole 36 is screw-clamped in the screw hole 34. Through the screw-clamp, the side mirror 14 is fixed on the door panel 12. Through the above-described processes, the side mirror 14 can be properly mounted on the door panel 12.

Here, in the side mirror unit 10, a temporary fixing of the side mirror 14 is made without using a frictional force. Therefore, a mounting of the side mirror 14 can be accomplished with a small force. In addition, in the temporary fixing of the side mirror 14, the cross-shaped boss 32 is inserted straight into the circular hole 30. Then, the side mirror 14 can be mounted with a high working efficiency without inclining a whole side mirror 14.

Further, when the vehicle sheet metal at the inner wall of the circular hole 30 is clamped in the groove of the cross-shaped boss 32, a click feeling (just fit feeling) takes place. Therefore, an operator can properly know a completion of the temporary fixing based on the click feeling. Accordingly, if configured as the side mirror unit 10, a working efficiency for mounting the side mirror 14 can be improved.

In addition, the cross-shaped boss 32 has not only a function of a locating boss for positioning the side mirror 14, but also a function of a member for making a temporary fixing. Accordingly, if being configured as the side mirror unit 10, the number of members of the side mirror 14 can be reduced. In addition, due to the reduced members of the configuration, the side mirror unit 10 can be provided at a lower cost.

Figure 2:
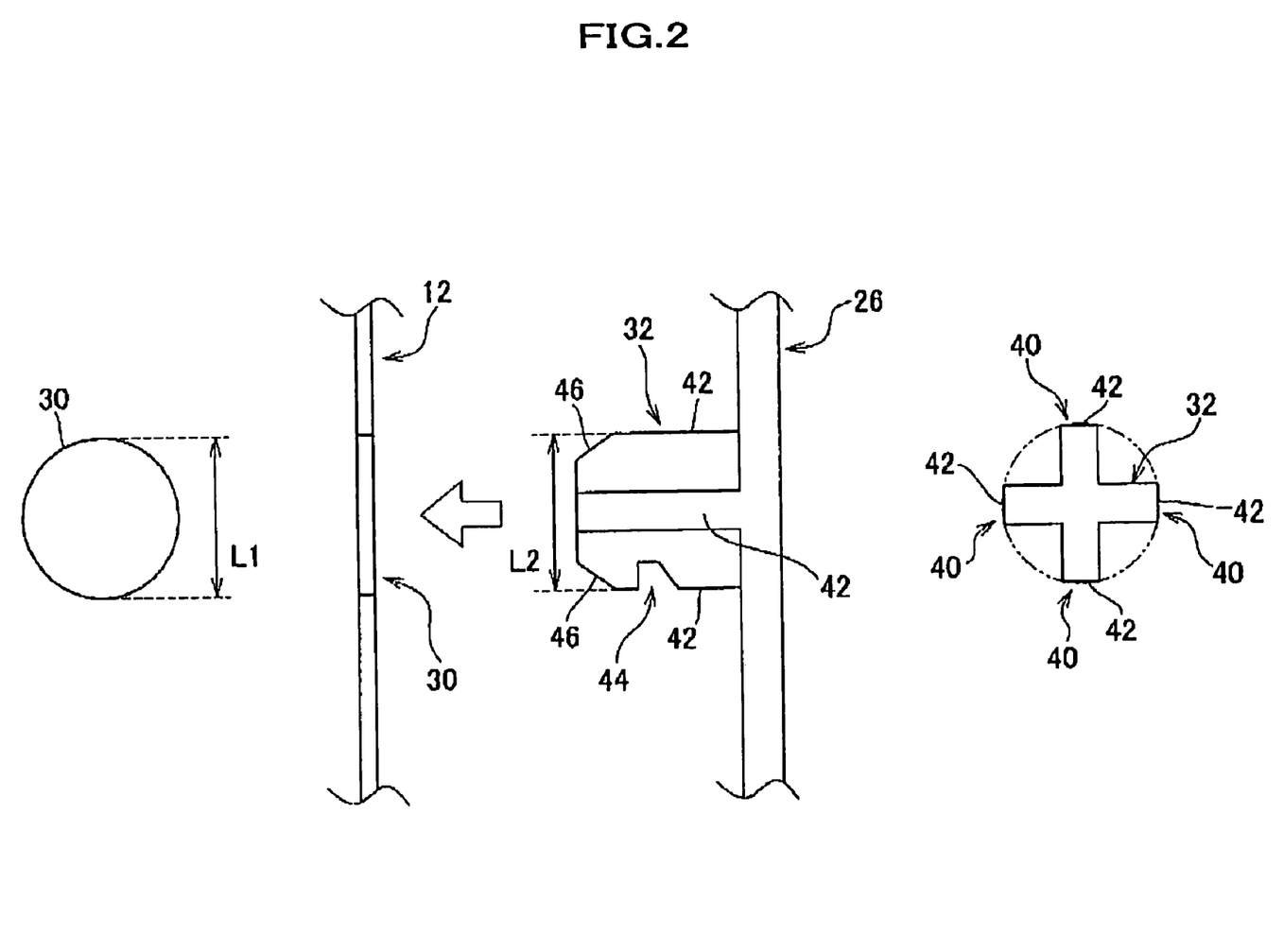
FIG. 2 is an illustration showing an example of a configuration of a cross-shaped boss 32 in detail.

FIG. 2 is an illustration indicating an example of a configuration of the cross-shaped boss 32 in detail. In the cross-shaped boss 32, an edge 46 which is in a tapered shape makes it easy to be inserted in the circular hole 30. At a part other than the edge 46, the cross-shaped boss 32 has a diameter L2 which is nearly equal to that of L1 of the circular hole 30.

In addition, the cross-shaped boss 32 has four side surfaces 42. The four side surfaces 42 correspond to four end faces 40 of the cross-shape of the section, and envelop each end face 40 along an axis direction of the cross-shaped boss 32. Further, the cross-shaped boss 32 has a groove 44 on one side surface 42 of the four side surfaces 42.

The groove 44 is a groove used for a temporary fixing of the side mirror 14, and extends in a direction approximately perpendicular to the axis direction of the cross-shaped boss 32. The cross-shaped boss 32 is inserted into the circular hole 30 under conditions that a side surface 42 on which the groove 44 is formed is faced downward and the axis direction is made almost horizontally. Then, when the cross-shaped boss 32 is inserted into the circular hole 30, the side mirror 14 is temporarily fixed on the door panel 12 by housing a part of the inner wall of the circular hole 30 in the groove 44.

Figure 3:
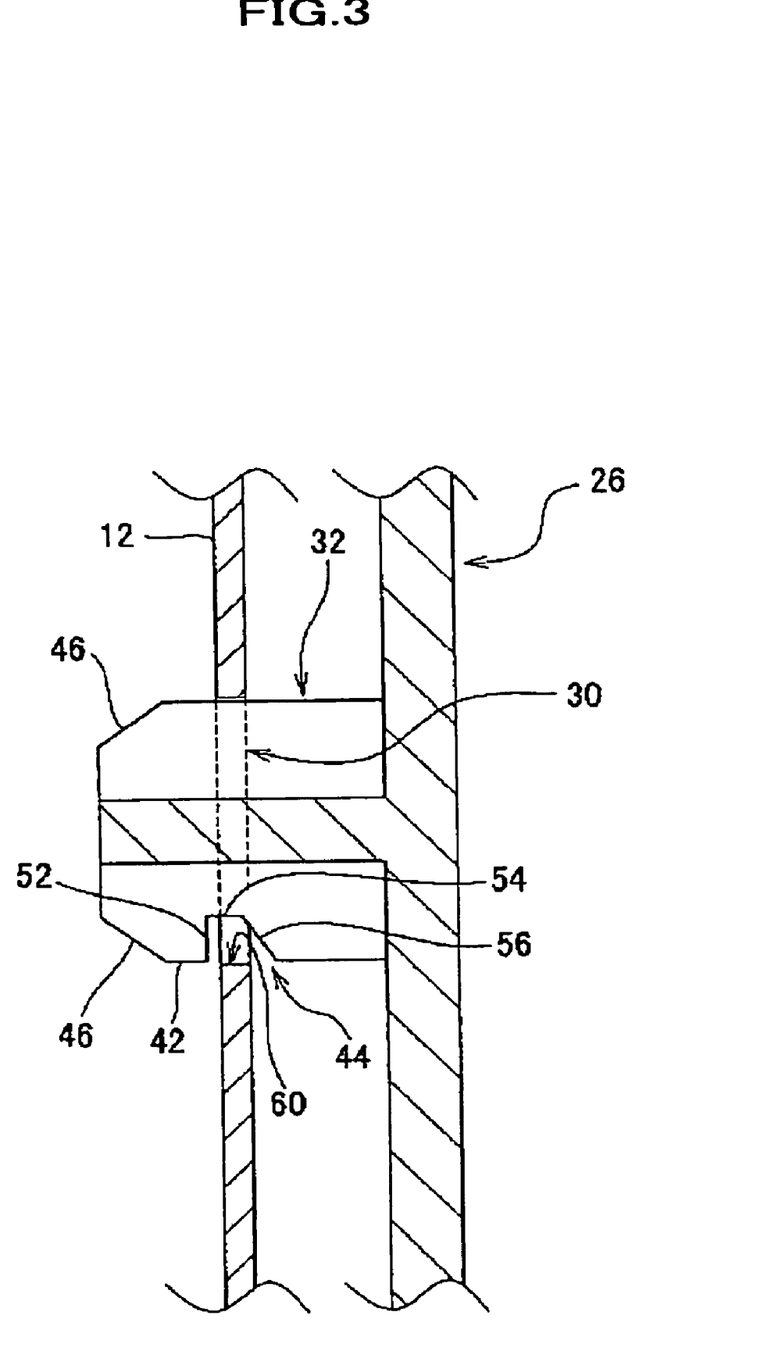
FIG. 3 is an illustration showing a configuration of a groove 44 in detail.

FIG. 3 is an illustration indicating an example of a configuration of the groove 44 in detail. The groove 44 includes a bottom surface 54, a wall face 52, and a wall face 56. The wall face 52 is a wall face on a side of the edge 46 of the cross-shaped boss 32, and formed almost perpendicular to a side surface 42 on which the groove 44 is formed. Also, the wall face 55 is a wall face at a root side of the cross-shaped boss 32, and formed in an oblique plane. The oblique plane is an oblique plane beginning further off the bottom surface 54 when approaching the root side.

Here, when the side mirror 14 (refer to FIG. 1) is temporarily fixed, the groove 44 houses a part 60 of the inner wall of the circular hole 30. Therefore, the wall face 52 comes in contact with the part 60 of the inner wall from the edge side of the cross-shaped boss 32. Then, when a force for pulling out the cross-shaped boss 32 from the circular hole 30 is applied, the inner wall of the circular hole 30 latches the wall surface 52. Accordingly, if configured as described above, the side mirror 14 can be temporarily fixed properly by preventing, for example, from coming off due to a mechanical shock and the like.

In addition, when a screw-clamp is made by the screw 38 (refer to FIG. 1), the cross-shaped boss 32 is inserted into the circular hole 30 deeper as the screw 38 is further tightened. When the cross-shaped boss 32 is inserted deeper, the wall face 56 guides the part 60 of the inner wall in the foot direction by the slope, while in contact with the part 60 of the inner wall of the circular hole 30. The mounting base 26 approaches to the door panel 12 along the oblique plane of the wall face 56 as a guide. Accordingly, if configured as described above, the screw is smoothly fixed on the door panel 12 by screwing.

Figure 4:
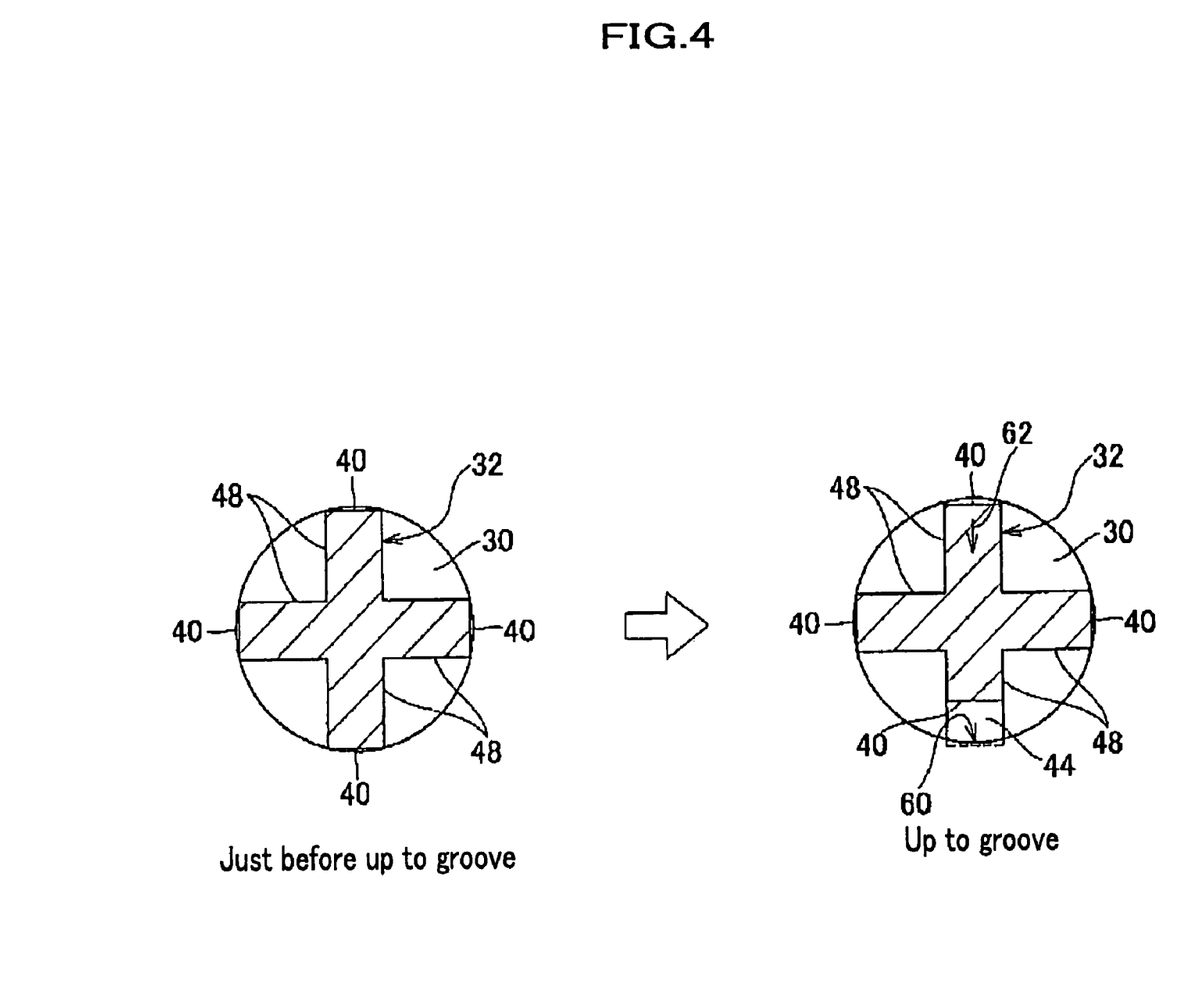
FIG. 4 is an illustration for explaining a function of a cross-shaped boss 32.

FIG. 4 is an illustration for explaining a function of the cross-shaped boss 32. When the cross-shaped boss 32 is inserted into the circular hole 30 until just before the groove 44 is reached, the cross-shaped boss 32 comes in contact with the inner wall of the circular hole 30 on the end 40 of four ribs 48 forming the cross-shape.

In addition, when the cross-shaped boss 32 is inserted into the circular hole 30 up to a position of the groove 44, the cross-shaped boss 32 is slightly displaced in a direction indicated by an arrow 62 by tensions from three ribs 48 other than a rib 48 where the groove 44 is formed. With the displacement, the groove 44 houses the part 60 of the inner wall of the circular hole 30, and the side mirror 14 is temporarily fixed on the door panel 12. In addition, the click feeling takes place when the part 60 of the inner wall bites into the groove 44.

Here, in a different configuration other than the above cross-shaped boss 32, the groove 44 may be formed on a rib 48 other than a rib 48 which is positioned downward when insertion is done. However, if configured like this, it is conceivable that a proper temporary fixing is impossible due to compensation of tensions from the other ribs 48 by a weight of the side mirror 14.

On the other hand, if the groove 44 is formed on a rib 48 which is faced downward when it is inserted, when the cross-shaped boss 32 is inserted up to the groove 44, the cross-shaped boss 32 can be certainly displaced in a direction indicated by the arrow 62 by a multiplier effect of the tensions from the other ribs 48 and the weight of the side mirror 14. Accordingly, if configured as described above, a temporary fixing of the cross-shaped boss 32 can be certainly made.

Figure 5:
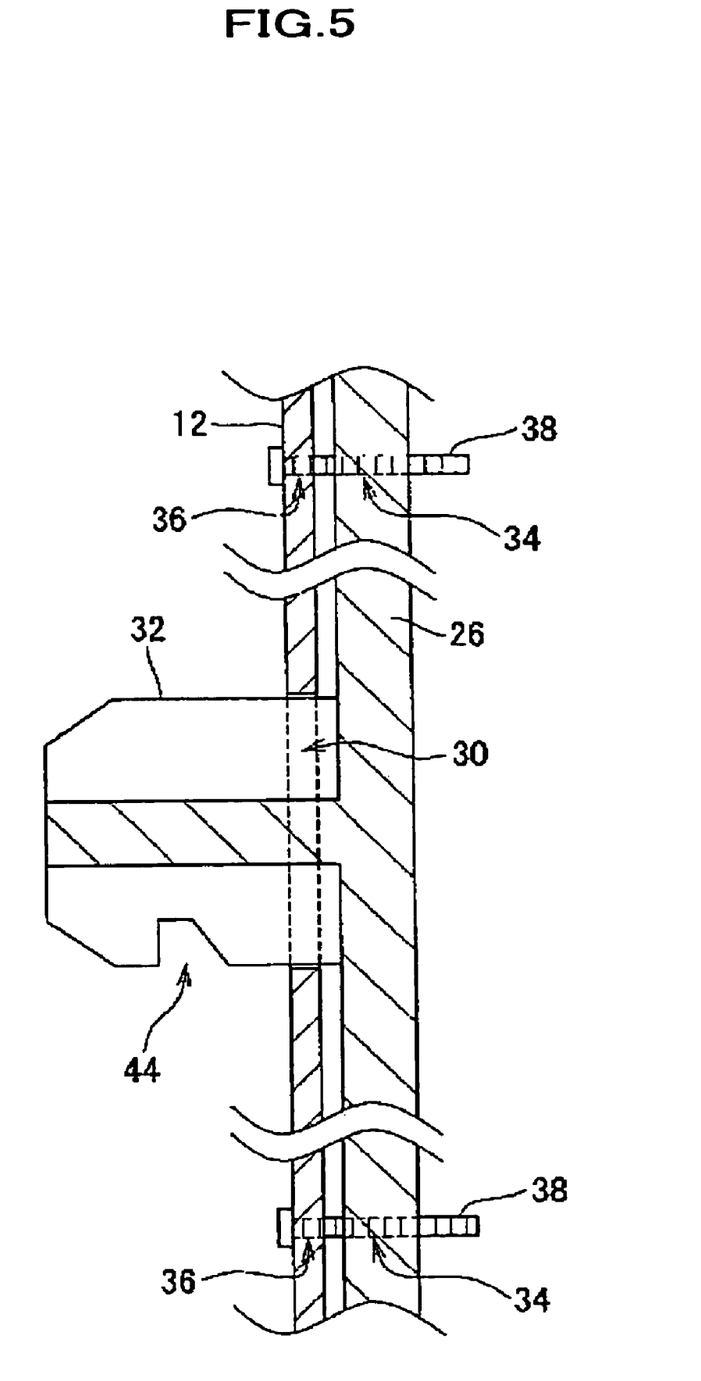
FIG. 5 is an illustration showing a side mirror 14 fixed on a door panel 12.

FIG. 5 is an illustration showing a side mirror 14 fixed on the door panel 12. The cross-shaped boss 32 is inserted into the circular hole 30 up to a root side deeper than the groove 44 by screw-clamping of the screw 38. Under this condition, the mounting base 26 is fixed on the door panel 12. Under this condition, the cross-shaped boss 32 comes in contact with the inner wall of the circular hole 30 at the end 40 of the four ribs 48 (refer to FIG. 4). Accordingly, the side mirror 14 can be fixed with a high accuracy.

Meanwhile, the cross-shaped boss 32 may have a wider groove 44 than the above. In this case, the mounting base 26 is fixed on the door panel 12 with a part of the inner wall of the circular hole 30 housed in the groove 44.

As described above, the present invention has been explained by using the embodiments. However, a technological extent of the present invention is not limited to the extent described in the above embodiments. It is obvious to a skilled person in the art that various modifications or improvements can be added to the above embodiments. It is obvious from the descriptions of the claims that the modified or improved embodiments can be included in the technological extent of the present invention.

INDUSTRIAL APPLICABILITY

The present invention can be suitably applied to, for example, a side mirror and a side mirror unit.

EXPLANATION OF SYMBOLS 10 side mirror unit, 12 door panel, 14 side mirror, 22 mirror, 24 external body, 26 mounting base, 30 circular hole, 32 cross-shaped boss, 34 screw hole, 36 through hole, 40 end, 42 side surface, 44 groove, 46 edge, 48 rib, 52 wall face, 54 bottom, 56 wall face, 60 part, 62 arrow

The invention claimed is:

1. A side mirror for mounting on a door panel of a vehicle body, comprising:
a mirror;
an external body for housing and holding the mirror; and
a mounting base for supporting the external body,
wherein the door panel has a circular hole for positioning the mounting base,
which is a cross-shaped boss to be inserted into the circular hole of the door panel, a section of the cross-shaped boss perpendicular to an axis direction has a cross-shape, a diameter of the section is approximately equal to a diameter of the circular hole, wherein
the cross-shaped boss has a groove extending in a direction approximately perpendicular to the axis direction on one side surface of four side surfaces which envelop four ends of the cross-shaped boss along the axis direction, respectively,
in the groove, a wall face on a tip side of the cross-shaped boss is approximately perpendicular to the one side surface, and a wall face on a root side of the cross-shaped boss is an oblique surface leaving further off a bottom as the oblique surface approaches to the root side, and
when the cross-shaped boss is inserted into the circular hole, the groove is hooked with a part of an inner wall of the circular hole so that the side mirror is temporarily fixed on the door panel.

2. The side mirror according to claim 1,
wherein the cross-shaped boss is inserted into the circular hole by positioning downward the one side surface having the groove with the axis direction being kept approximately horizontally.

3. The side mirror according to claim 2,
wherein the mounting base is fixed on the door panel with the cross-shaped boss inserted into the circular hole so that the groove goes beyond the circular hole and the root side of the boss is in the circular hole.

4. A side mirror unit for vehicles, comprising:
a door panel attached on a vehicle body; and
a side mirror mounted on the door panel,
wherein the side mirror comprises:
a mirror;
an external body for housing and holding the mirror; and
a mounting base for supporting the external body,
wherein the door panel has a circular hole for positioning the mounting base;
which is a cross-shaped boss to be inserted in the circular hole of the door panel, a section of the cross-shape boss perpendicular to an axis direction has a cross-shape, a diameter of the section is approximately equal to a diameter of the circular hole, wherein the cross-shaped boss has a groove extending in a direction approximately perpendicular to the axis direction on one of four side surfaces which envelop four ends of the cross-shape boss along the axis direction, respectively, in the groove, a wall face on a tip side of the cross-shaped boss is approximately perpendicular to the one side surface, and a wall face on a root side of the cross-shaped boss is an oblique surface leaving further off a bottom as the oblique surface approaches to the root side, and when the cross-shaped boss is inserted into the circular hole, the groove is hooked with a part of an inner wall of the circular hole so that the side mirror is temporarily fixed on the door panel.

5. The side mirror according to claim 4, wherein the mounting base is fixed on the door panel with the cross-shaped boss inserted into the circular hole so that the groove goes beyond the circular hole and the root side of the boss is in the circular hole.

* * * * *